April 21, 1970     S. L. SEYMOUR     3,507,639
METHOD OF PRESS SHAPING GLASS SHEETS
Filed Sept. 30, 1966     2 Sheets-Sheet 1

INVENTOR
SAMUEL L. SEYMOUR

BY
ATTORNEYS

April 21, 1970 S. L. SEYMOUR 3,507,639
METHOD OF PRESS SHAPING GLASS SHEETS
Filed Sept. 30, 1966 2 Sheets-Sheet 2

INVENTOR
SAMUEL L. SEYMOUR

ATTORNEYS

United States Patent Office 3,507,639
Patented Apr. 21, 1970

3,507,639
METHOD OF PRESS SHAPING GLASS SHEETS
Samuel L. Seymour, Oakmont, Pa., assignor to PPG Industries, Inc., Pittsburgh, Pa., a corporation of Pennsylvania
Filed Sept. 30, 1966, Ser. No. 583,197
Int. Cl. C03b 23/02
U.S. Cl. 65—104
7 Claims

ABSTRACT OF THE DISCLOSURE

Maintaining glass sheet press bending molds at a desired temperature range by cooling the molds with a pattern of non-uniform intensity, preferably one that intensely cools the portion that engages the glass sheet portions engaged by elements that engage the shaped glass en route to a quenching station so that the press bending molds shape heat-softened glass sheets by pressurized engagement and cool the glass sheet portion likely to become distorted sufficiently to enable the glass sheet to retain its shape within permitted tolerance as it travels from the press bending station to a quenching station on rollers, even though the pressurized engagement is of relatively short duration. The pressing mold cooling is sufficient to prevent the overall mold temperature from exceeding a desired equilibrium temperature even at rapid production rates.

---

The present invention relates to shaping glass sheets, and particularly refers to an improvement in apparatus for press bending glass sheets, particularly to glass sheets that are bent in a horizontal press bending operation.

Many glass sheet articles such as face plates for television tubes are shaped between a pair of shaping members having complementary glass shaping surfaces conforming to the shape desired for the opposite surfaces of the shaped glass sheet. It has been found to be especially efficient to press bend glass sheets suitable for use as television tubes having rectangular outlines and shaped about both major and minor axes at uniform rates of curvature by conveying a series of glass sheets along a horizontally disposed roller conveyor extending in a horizontal direction through a tunnel type furnace, a shaping station and a quenching station.

The glass sheets are moved in series through the furnace where they are heated in sequence to a temperature sufficiently high for deformation, then they are transported to the shaping station at a sufficiently high temperature for deformation and are stopped between upper and lower shaping members. The lower shaping member is normally disposed in a retracted position below the horizontal plane of the roller conveyor and when the glass sheet occupies a position intermediate the upper and lower shaping members, the lower member is moved upward through the plane occupied by the roller conveyor to press the glass sheet into a shape conforming to that of the shaping surfaces of the upper and lower glass shaping members. The lower shaping member is then moved downward into retracted position and the heated, bent glass sheet is transported from shaping station to the quenching station where the glass sheet is rapidly cooled to heat-strengthen or toughen the glass.

Before the present invention, the still hot, bent glass sheets were distorted during their transfer from the pressing station to the quench, particularly relatively thin glass sheets of ⅛ inch nominal thickness, unless the holding time for the glass sheets in the press was extended to 11 seconds or more. Such an extended holding time reduced output of the pressing apparatus at a time when the demand for color television was so great that it became necessary to consider the building of additional fabrication equipment. This reduced output resulted from the need to permit additional time for the shaping members to cool sufficiently to compensate for the greater heat build-up in the shaping members resulting from their more prolonged contact with the successive deformable glass sheets, particularly when operations continued for several hours without any shutdown for replacing covers or for some other reason causing a shutdown.

The present invention makes it possible to increase the output of the press bending and tempering apparatus by a factor of 38 percent to 46 percent while substantially eliminating deviation from the design curvature of the television face plates resulting from transporting the shaped glass from the press to the quench immediately after its shaping. This has been accomplished by attaching to each of the shaping members means for preventing an excessive increase in the temperature of the shaping members so that at least the portion of each bent glass sheet that contacts the conveyor rolls while it transfers face down from the shaping station to the cooling station would be sufficiently rigid after its shaping by press bending with a reduced hold time of 6 seconds or less to reduce distortion of the bent glass during said transfer.

Bernard Long in U.S. Patent No. 1,879,699 applied cooling fluid directly to the upper and lower edges of glass sheets heat treated for tempering while suspended from tongs to thicken the upper and lower edges of the glass and makes the edges more resistant to blows. Heretofore, this technique has been applied only to the tempering of flat glass sheets supported by tongs for tempering and it has never been suggested to cool the marginal portion of glass sheets by cooling glass shaping members during a mass production glass shaping operation in such a manner that maximum cooling is effected in the portion engaging the glass sheet margin.

The present invention will be better understood after one reads a description of an illustrative embodiment and an alternative thereof which follows.

In the drawings which form part of the present description, and wherein like reference numbers have been applied to like structural elements, FIG. 1 is a longitudinal elevation of a glass shaping apparatus modified according to the present invention with certain elements broken away to show other elements thereof, and showing its relation to the exit of a typical tunnel type furnace and a typical quenching station;

Figure 1:
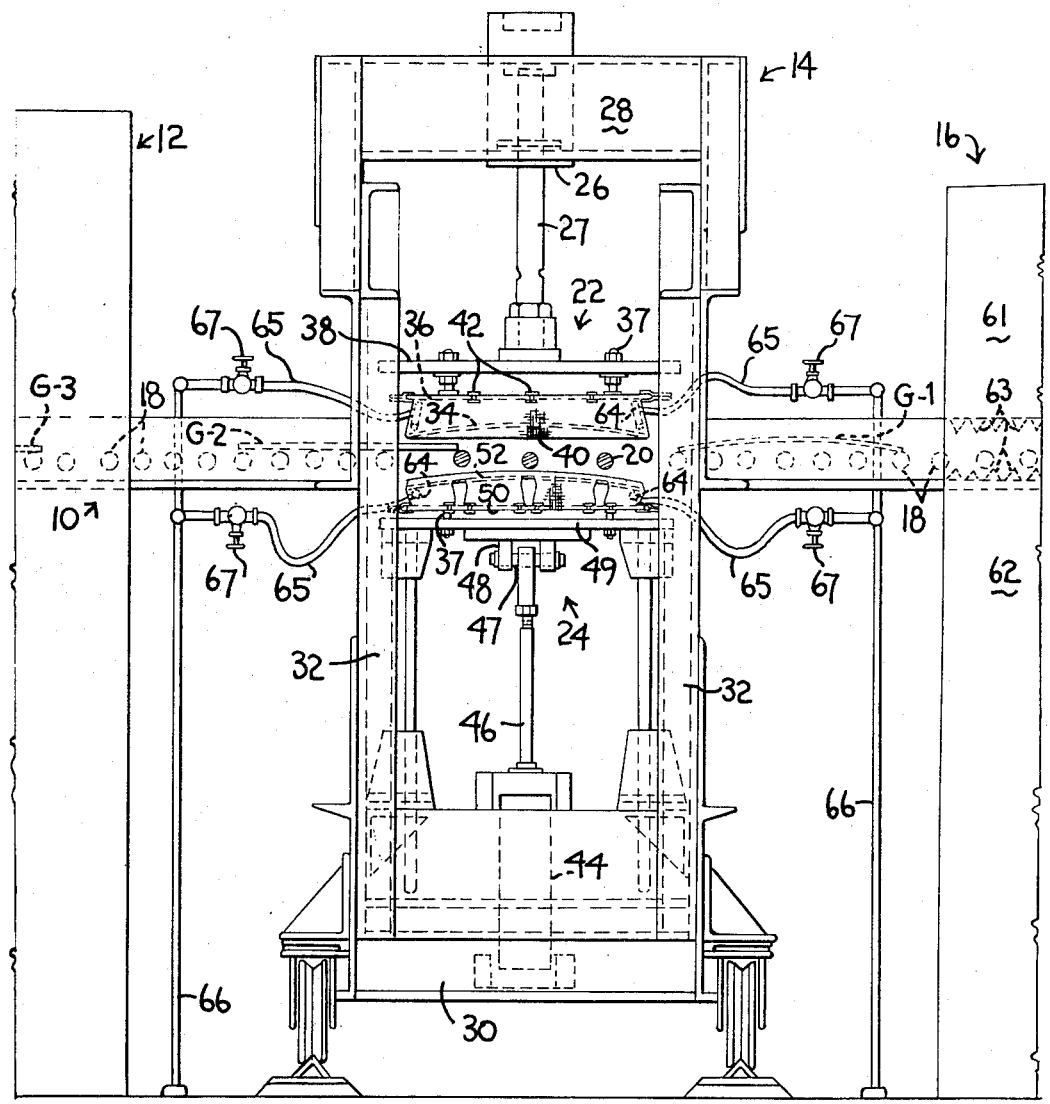

Referring to the drawings, a horizontal roller conveyor 10 is shown extending through a tunnel type furnace 12, a glass shaping station 14 and a quenching station 16. The conveyor comprises continuous rolls 18 throughout the entire extent thereof except for three sets of stub rolls 20 at at the glass shaping station 14.

The tunnel type furnace comprises conventional electric heaters (not shown) mounted above and below the horizontal plane occupied by the rolls comprising the roller conveyor 10 so as to radiate heat onto the upper and lower surfaces of glass sheets transported therethrough. This is a conventional tunnel type furnace well known in the art and need not be further described herein.

The shaping station 14 comprises an upper shaping member 22 and a lower shaping member 24. The upper shaping member 22 is supported from an upper air cylinder housing 26 having a vertically extending piston 27 extending downwardly therefrom. An upper frame 28 supports the housing for the upper air cylinder 26. The glass shaping station also comprises a lower frame 30 rigidly attached to the upper frame 28 by vertical stanchions 32 forming an open structure.

The upper shaping member 22 comprises a downwardly facing shaping plate 34 having a downward facing curved shaping surface that is recessed upward from a horizontal plane. A series of jointed connectors 35 attach a backing plate 36 in spaced relation behind the shaping plate 34. Addiitonal rigid connectors 37 connect a piston plate 38 in spaced relation to the rear of the backing plate 36. In turn, piston plate 38 is connected to the lower end of the piston 27.

A cover 40 of a material that does not mar heat softened glass, such as knit fiber glass cloth composed of textured yarns, is mounted in front of the downward facing shaping surface of the shaping plate 34. Clamps 42 are arranged around the periphery of the backing plate 36 to secure the free ends of the cover 40 in slightly stretched condition in position to protect the upper surface of the glass sheets from direct contact with the lower shaping surface of the shaping plate 34.

The lower frame 30 supports a lower air cylinder 44 having an upwardly extending piston 46 which terminates at its upper end in a pivotal connection 47 to a bracket 48. The latter, in turn, is attached to the rear surface of a piston plate 49 for the lower glass shaping member 24. The piston plate 49 is connected in spaced relation behind a backing plate 50 by rigid connectors 37 in a manner identical to how the corresponding plates of the upper shaping member 22 are kept in spaced relation from each other. The lower shaping member 24 also includes an upward facing shaping plate 52 whose upward facing shaping surface protrudes upward from a horizontal plane to provide a protruding shaping surface that confirms to a downward facing recessed shaping surface provided on the shaping plate 34. Additional jointed connectors 35 serve to connect the shaping plate 52 in spaced relation in front of backing plate 50 in a manner similar to their function for connecting shaping plate 34 in spaced relation to backing plate 36 of upper shaping member 22.

A fiber glass cover 53 similar to cover 40 is provided for the lower shaping member 24. Clamps 54 are utilized to clamp the cover 53 in slightly stretched relation in front of the upper shaping surface of shaping plate 52. Clamps 54 operate in the same manner for lower shaping member 24 as clamps 42 do for upper shaping member 22.

The upper shaping member 22 is always in position above the horizontal plane of support for the glass sheets provided by the upper peripheral surfaces of the horizontal roller conveyor 10. The lower shaping member 24 is movable from a recessed position shown in solid lines of FIGS. 1 and 2 to beyond an upper position, shown in dotted lines in FIG. 2, wherein the lower shaping member is above the plane of support provided by the horizontal roller conveyor 10. In order to perform this function, the lower shaping member 24 is provided with a series of notches 56, each aligned with one of the stub rolls 20 of the horizontal roller conveyor 10.

The cover 53 is cut to form flap portions at each of the notches 56. The free ends of the flap portions of cover 53 are wedged into channel members 57 immediately below the shaping plate 52 by resilient, expandable hair-pin shaped clips 58 that expand outward into the outer walls of the channel members 57.

Figure 2:
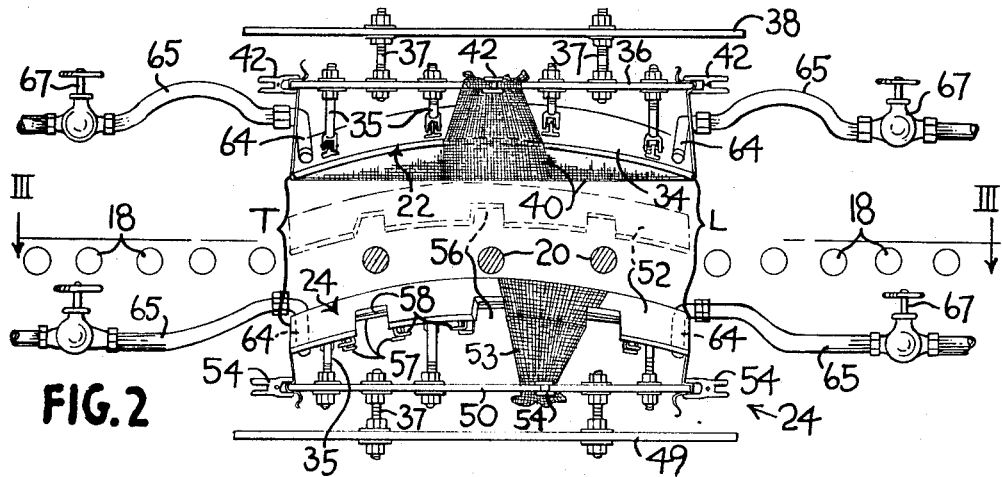
FIG. 2 is an enlarged, fragmentary, detailed view of an illustrative embodiment of shaping members modified according to the present invention showing the lower shaping member in its retracted position in solid lines and in a position approaching the upper shaping member in phantom.
Figure 3:
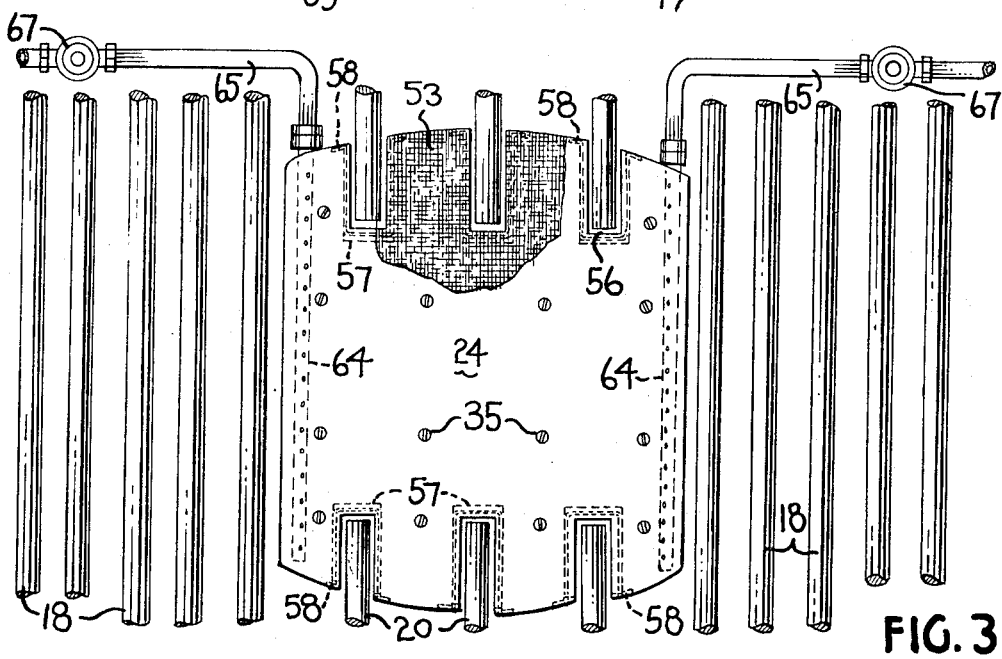
FIG. 3 is a plan view of one of the shaping members taken along the lines III—III of its solid line position of FIG. 2.

U.S. Patent No. 3,374,080 of Robert W. Wheeler discloses details of how notches 56 are constructed to provide clearance for the stub rolls 20, how the roller conveyor is sectionalized. The Wheeler patent also describes limit switch controls for actuating the shaping members and the sections of conveyor rolls in a predetermined sequence of steps so that glass sheets are moved at one speed through the furnace, accelerated to the shaping station and stopped in alignment between the shaping members, lifted by the lower shaping member off the roller conveyor into pressurized engagement against the upper shaping member for a predetermined holding time, then released from pressurized engagement and lowered on to the roller conveyor and transferred at a faster speed than said tunnel speed to the quenching station, then conveyed at a slower speed through the quenching station in a manner well known in the art. FIG. 1 shows that a first glass sheet G1 is transferred after shaping from the shaping station 14 to the quenching station 16 while a second glass sheet G2 enters the shaping station 14 and a third glass sheet G3 traverses the furnace 10.

Shaping plates 34 and 52 are adjustable in shape by virtue of their jointed connections 35 to backing plates 36 and 50, respectively, in a manner disclosed and claimed in U.S. Patent No. 3,367,764 of Samuel L. Seymour. The specific details of the inventions described and claimed in the aforesaid patents are incorporated by reference in the present case to furnish access to a complete description of an illustrative embodiment of the present invention without causing the present specification to become prolix by reference to details of other inventions incorporated in the present apparatus.

The quenching station 16 comprises the usual upper plenum chamber 61 and lower plenum chamber 62. Each of the plenum chambers has a series of parallel nozzles 63 of the elongated slot type facing the upper and lower surfaces of bent glass sheets supported along the portion of the horizontal roller conveyor 10 that traverses the quenching station 16 for cooling the upper and lower surfaces of the glass sheet. The nozzle lengths may be parallel to the axes of conveyor rolls 18 at the quenching station 16 or the nozzles may extend diagonally with their openings located in planes parallel to the plane of support along the conveyor rolls 18.

The apparatus described thus far is typical of the apparatus prior to the present invention.

According to the present invention, elongated apertured pipes 64 are provided along the rear face of shaping plates 34 and 52. The pipes 64 are arranged preferably in pairs extending across the leading and trailing edges of both the upper and lower shaping members 22 and 24. Each pipe 64 is connected through a flexible supply pipe 65 to a main pipe 66. A valve 67 in each of the supply lines provides means for adjusting the rate of fluid flow into the apertured pipes.

Each of the pipes 64 has its apertures directed toward the rear surface of the shaping plate behind which it is fixed. For example, the elongated apertured pipes 64 for the upper shaping member 22 are disposed behind the upper shaping plate 34 and the apertures are directed toward the upper surface of the shaping plate 34, whereas the apertured pipes 64 for the lower shaping member 24 are disposed behind the shaping plate 52 of the lower shaping member 24 and are directed upwardly toward the lower surface of the shaping plate 52. The apertures of pipes 64 extend in such a direction as to direct streams of fluid toward the leading edge L and trailing edge T (FIGS. 2 and 4) of the shaping plates 34 and 52.

A typical operation is depicted in FIG. 1, wherein a first glass sheet G–1 is transferred from the shaping station 14 to the quenching station 16, while a second glass sheet G–2 enters the shaping station 14 and a third glass sheet G–3 is still being heated to a deformation temperature in the furnace 12. In this operation, rectangular shaped television tube face plates ⅛ inch thick about 15 inches by 20 inches and having a 25 inch diagonal dimension were bent to spherical shapes by horizontal press bending while applying 18,000 cubic feet per hour of free air to each of the air pipes extending along the longer edges L and T of the plates 34 and 52. The air was applied cold to the four apertured tubes equally.

The glass was heated to a maximum temperature of about 1220 degrees Fahrenheit in the furnace and cooled to about 1180 degrees Fehrenheit when it was engaged by the shaping members. The shaping members 22 and 24 were oriented so that the shorter side edges of the lower shaping plate 52 were notched.

Each shaping member plate was formed of ¼ inch thick hot rolled steel 2 inches longer and 2 inches wider than the glass sheets undergoing shaping to form a continuous extension 1 inch wide beyond the outer edge of the glass, except for the notched portions. Two layers of knit fiber glass cloth covered the glass facing surface of each plate. Each fiber glass cloth layer was composed of about 10 percent textured yarn 150–1/0–1.0 Z DE of 28 gauge (18⅔ needles per inch) and 26 stitch or courses per inch. Such covers are described and claimed in U.S. Patent No. 3,148,968 to James H. Cypher et al.

The pipes were ¾ inch in diameter with 1/16 inch holes drilled in linear alignment on 1 inch centers. The pipes were disposed to blow air obliquely inwardly onto the rear surface of the attached shaping plates to impinge about 1 inch inward from their edges in a direction toward the center of the shaping members. This air application resulted in forced cooling of the shaping members with a maximum cooling effect resulting in the marginal portion of the shaping members that engaged the glass sheet margin and gradually decreasing heat exchanging capacity per unit area toward the central region of the shaping members that engaged the central portions of the glass sheets. This air cooling thus caused the margins of rectangular shaped glass sheets to be cooler and hence more resistant to deformation than the central portions thereof after pressing. This stronger edge allowed the shaped glass to be transported along the roller conveyor with their concave surfaces facing down from the pressing station to the quenching station while avoiding deviation beyond tolerance limits despite the bumpy passage.

Such a rate of air flow through this structure made it possible to maintain an equilibrium temperature of about 600 degrees Fahrenheit for the shaping members and to bend the glass within desired tolerances using a holding time of only 6 seconds for the pressurized sandwiching between the shaping members. Previous to the installation of the air pipes, it was necessary to hold the shaping members for 11 seconds in pressurized engagement against the opposite surfaces of the heat softened glass sheets to insure that glass sheets were kept within the bending tolerances.

After about 1½ hours of uninterrupted operation using the longer hold period of the prior art at a fixed production rate without any cold air application, the shaping plates became heated to such an extent (over 700 degrees Fahrenheit) that the bent glass sheets produced deviated to an increasing extent from the design curvature. After several additional hours of uninterrupted production, the deviation began to exceed tolerance limits established by the customer. This deviation was controlled within tolerance limits by reducing the production rate, thus allowing more time between successive glass sheet pressings for the shaping members to cool.

In addition, using prior art techniques of longer holding time and high production rates, the shaping plates raised the temperature of the bent glass sheets by thermal conduction to such an extent that the glass surface temperature was so high while the glass was moving from the shaping station to the quenching station that the shaped glass sheets began to distort during their transfer. Reducing the production rate alleviated this problem also. However, low production rates could not be accepted when television tube demand was so great.

The introduction of the cold air blasts through the apertured pipes enabled the shaping members to cool to a stabilized temperature more rapidly between successive pressings to permit a higher rate of production of bent glass within tolerance. The cold air flow to the shaping plate margin maintained the shaping plates at the design shape and a stabilized temperature for each successive shaping. The lower stabilized temperature of the shaping members produced bent glass sheets having relatively rigid surfaces so that the bent glass was able to maintain its shape within the tolerances required by the customer during its transfer from the shaping station to the quenching station. Therefore, the present invention resulted in more uniform production of press bent glass sheets within design tolerances hour after hour after hour at relatively high uninterrupted production rates.

Figure 4:
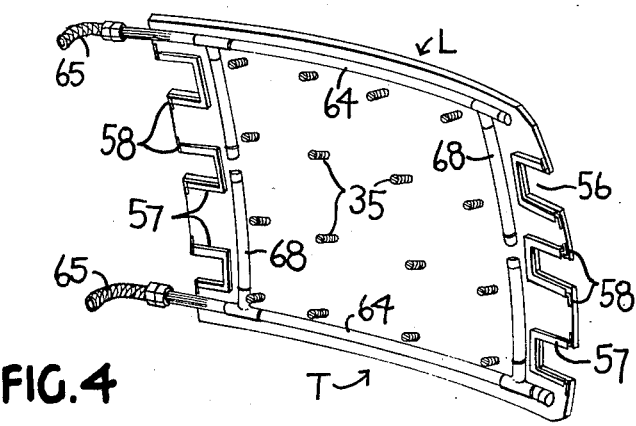
FIG. 4 is a rear perspective view of a shaping plate of a lower glass shaping member with only parts pertinent to the present invention associated therewith to disclose an alternate embodiment of the present invention.

An alternative embodiment of the present invention is shown in FIG. 4 wherein the elongated apertured pipes 64 extend into additional branches 68 to help cool the entire perimeter of the shaping plate 34 or 52. It was found unnecessary to cool the entire shaping plate during the shaping operation. It was sufficient to apply cooling fluid only to a marginal portion thereof in order to retain the glass shape within the tolerances required by the customer.

The form of the invention shown and described in this disclosure represents an illustrative embodiment and a modification thereof. It is understood that various changes may be made such as varying the equilibrium temperature of the shaping members which must be suitable for the set of process parameters met with each pattern such as glass temperature, glass compositions, glass dimensions, thickness and composition of covering and shaping plates, etc. Also, the size and/or spacing and manner of aligning the apertures in the pipes 64 may be modified and fluids other than air may be applied and/or the fluid may be applied at different, steady or varying or intermittent rates, for example, to provide a constant uniform equilibrium temperature such as by increasing the rate of cold fluid flow when engaging the glass and decreasing the fluid flow when the shaping members are retracted or a recurring cycle of temperature including an equilibrium temperature at the onset of glass engagement for each cycle, if desired, which may be produced by a steady, varying or intermittent fluid flow either during the pressurized engagements of the shaping members against the hot glass or in the intervals between successive engagements or any portions of either or both said engagements or said intervals between said engagements without departing from the spirit of the invention as defined in the claimed subject matter which follows as long as fluid is supplied in sufficient amount to effect a heat exchanging relationship with the shaping plates to offset the gradual temperature increasing effect that characterized the prior art mass production press bending.

What is claimed is:

1. In a method of press bending glass sheets at a rapid rate wherein said glass sheets are heated to their deformation temperature in series and the leading sheet of the series is sandwiched in pressurized engagement throughout substantially its entire surface area between a pair of relatively cold, rigid shaping members having substantially coextensive shaping surfaces conforming to the shape desired for the opposite major surfaces of the bent glass sheets for sufficient time to shape the deformable glass, and supporting the shaped sheets by engaging certain portions by solid conveyor elements while said shaped sheets are transported after their shaping to a quenching station, and the next sheet in said series of heated sheets is conveyed to a position between said shaping members for a shaping operation, the improvement comprising force cooling said shaping members by blowing fluid under pressure against said shaping members in a pattern that is more intense against those portions of the shaping members that engage those certain portions of the glass sheets that are supported during their transport to said quenching station and less intense against those portions of the shaping members that engage other portions of the glass sheets remote from said supported portions, at a rate sufficient to accelerate the cooling of the surfaces of said portions of the glass sheets to below the deformation temperature during said pressurizing engagement, placing a glass sheet heated throughout to substantially its deformation temperature between said shaping members, engaging said deformable glass sheet with said shaping members to shape said glass sheet, disengaging said shaping members from said shaped glass sheet, and removing said shaped glass sheet from between said disengaged shaping members by engaging only said certain cooler portions of said glass sheet with solid conveyor elements.

2. In a method of press bending a glass sheet wherein said glass sheet is heated to its deformation temperature and is sandwiched in pressurized engagement throughout substantially its entire surface area between a pair of relatively cold, rigid shaping members having substantially coextensive shaping surfaces conforming to the shape desired for the opposite major surfaces of the bent glass sheet for sufficient time to shape the deformable glass, and supporting the shaped sheet by engaging certain portions by solid conveyor elements while said shaped sheet is transported after its shaping to a quenching station, the improvement comprising force cooling said shaping members by blowing fluid under pressure against said shaping members in a pattern that is more intense against said certain portions of the shaping members that engage those portions of the glass sheet that are supported during its transport to said quenching station and less intense against other portions of the shaping members that engage those portions of the glass sheet remote from said supported portions, at a rate sufficient to accelerate the cooling of the surfaces of said certain portions of the glass sheet to below the deformation temperature during said pressurized engagement, and removing said bent sheet from between said shaping members by engaging only said certain cooler portions of said glass sheet.

3. In the method according to claim 2, wherein said shaping members are separated from one another between successive pressurized engagements and said fluid is applied during said separations.

4. In the method according to claim 2, wherein said shaping members are separated from one another between successive pressurized engagements, wherein said fluid is applied constantly during both said separations and during said engagements.

5. In the method according to claim 4, wherein the fluid is applied at a greater rate of flow during said engagements than during said separations.

6. In the method according to claim 2, wherein said fluid is applied during said engagements.

7. In the method according to claim 2, wherein said fluid is applied in a pattern that is intense at a certain portion of each said shaping member that engages spaced marginal edge portions of said glass sheet during said pressurized engagement.

References Cited

UNITED STATES PATENTS

| | | | |
|---|---|---|---|
| 2,897,632 | 8/1959 | Fowler et al. | 65—288 X |
| 3,203,777 | 8/1965 | Berry et al. | 65—355 X |
| 3,265,484 | 8/1966 | Ritter | 65—104 |

ARTHUR D. KELLOGG, Primary Examiner

U.S. Cl. X.R.

65—106, 275, 288, 319, 356